Patented Feb. 25, 1941

2,232,944

UNITED STATES PATENT OFFICE 2,232,944

MANUFACTURE OF 1-CARBALKOXY-BUTADIENES-1,3

Herbert Gudgeon and Rowland Hill, Blackley, Manchester, England, assignors to Imperial Chemical Industries Limited, a corporation of Great Britain No Drawing. Application December 21, 1939, Serial No. 310,471. In Great Britain December 23, 1938

11 Claims. (Cl. 260—486)

This invention relates to the manufacture of compounds of the general formula $CH_2:CH.CH:CH.COOR$ in which R stands for an alkyl or alkoxyalkyl radical containing not more than 5 carbon atoms. These compounds are 1-carbalkoxy- and -carbalkoxyalkoxy- -butadienes-1,3.

According to the invention we make the said compounds by heating alkyl or alkoxyalkyl α-acyloxy-β-ethylidene propionates of the general formula $CH_3.CH:CH.CHOacyl.COOR$ in which R stands for the same as before, and "acyl" stands for the residue of an aliphatic or aromatic monocarboxylic acid, in gaseous or vapor form at temperatures at which they decompose. A typical ester is methyl α-acetoxy-β-ethylidene propionate.

The heat treatment of the esters is conveniently effected in tubes or other containers through which gases or vapors may be passed, which may be of glass or other suitable material, and which may be empty or packed with glass, earthenware or other suitable contact material. The ester may be vaporised either in the tubes or before entering them, and the vapor may be diluted with nitrogen gas or benzene vapor, or other inert gas or vapor. The best temperature for the process depends upon the particular ester and upon the time of its contact with the heated surfaces. In general we have found that temperatures between 350° and 600° C. are satisfactory, and that temperatures between 450° and 550° C. are especially suitable.

The compounds which are used as starting materials in the present invention, can be made by acylating α-hydroxy-β-ethylidene propionates of the general formula $CH_3.CH:CH.CHOH.COOR$ in which R means the same as before, with the anhydride of the appropriate aliphatic or aromatic carboxylic acid. The α-hydroxy-β-ethylidene propionates can themselves be made by reacting together crotonaldehydecyanohydrin, water, hydrochloric acid and an alcohol of Formula ROH, the water being used in quantity corresponding to about one molecular proportion to one molecular proportion of the cyanohydrin, and the acid in quantity in excess of that necessary to combine with the ammonia formed.

The following examples, in which parts are by weight, illustrate but do not limit the invention.

Example 1

Methyl α-acetoxy-β-ethylidene propionate (made as described below) is fed under gravity at a rate of 300 gm. per hour per tube through Pyrex glass tubes each 100 cm. long, 4.6 cm. internal diameter, and packed for a length of 80 cm. with stainless steel Lessing rings. The tubes are heated to an internal temperature of 450–470° C. The issuing vapors are condensed and the condensate is freed from acetic acid by washing with 15% aqueous sodium carbonate solution. The oil obtained is fractionated under reduced pressure and gives a good yield of 1-carbomethoxy-butadiene-1,3, b. p. 54° C./24 mm.

Methyl α-acetoxy-β-ethylidene propionate is made as follows:

490 parts of crotonaldehydecyanohydrin (made by adding 350 parts of crotonaldehyde to 135 parts of hydrogen cyanide containing 5 parts of diethylamine as catalyst) are mixed with 480 parts of methyl alcohol and heated to 60° C. About one-third of a mixture of 480 gm. of methanol, 173 parts of 35.4% hydrochloric acid into which have been passed 160 parts of hydrogen chloride gas, are then added and a vigorous reaction occurs. The rest of the acid mixture is added as fast as the vigor of the reaction will allow (e. g. in about 20 minutes), and the mixture is heated at 70° C. for 8 hours. The excess acid is neutralised with alcoholic potassium hydroxide solution, the precipitated salts filtered off and the liquid distilled in vacuo. The methyl α-hyroxy-β-ethylidene propionate, is collected at 90–94°/15 mm. 100 parts of this propionate are gradually added to 86 parts of boiling acetic anhydride containing 1 part of 96% sulphuric acid. The resulting product is distilled in vacuo through a fractionating column and methyl α-acetoxy-β-ethylidene propionate is collected at 114–118°/20 mm.

Example 2

Butyl α-acetoxy-β-ethylidene propionate (made as described below) is fed under gravity at a rate of 270 gm. per hour per tube through Pyrex glass tubes of the dimensions given in Example 1 and with the same filling. The tubes are heated to an internal temperature of about 470–490° C. The issuing vapors are condensed and the condensate is freed from acetic acid by washing with 15% aqueous sodium carbonate solution. The oil obtained is fractionated under reduced pressure, and 1-carbobutoxybutadiene-1,3 is collected at 90–98° C./20 mm.

Butyl α-acetoxy-β-ethylidene propionate is made as follows:

146 parts of crotonaldehydecyanohydrin were run gradually into a stirred mixture of 25 parts of water and 518 parts of n-butyl alcohol, to which has been added 50 parts of hydrogen chloride gas, initially at a temperature of 80° C. The temperature rises during the addition, which occupies about 20 minutes, and the mixture is then heated at 80–80° for 18 hours. After neutralisation of the excess acid and filtering off the deposited salts, the liquid is fractionated. Butyl-α-hydroxy-β-ethylidene propionate, b. p. 140–141°/41 mm. is obtained in very good yield. This is then acetylated as before. Butyl α-acetoxy-β-ethylidene propionate is obtained in very good yield.

*Example 3*

A solution of ethyl α-acetoxy-β-ethylidene propionate (made like the corresponding methyl ester) in twice its weight of benzene is fed at a rate of 500 gm. of solution per hour per tube through Pyrex glass tubes of the dimensions given in Example 1, filled with unglazed earthenware rings. The tubes are kept at an internal temperature of 470–490° C. The issuing vapors are condensed, and the condensate is washed free from acid with 5% sodium hydroxide solution. The washed solution is fractionated under reduced pressure, and 1-carbethoxy-butadiene-1,3 is collected at 63–65° C./18 mm. in good yield.

Ethyl α-propionoxy-β-ethylidene propionate when pyrolysed under the same conditions gives an equally good yield of 1-carbethoxy-butadiene-1,3.

*Example 4*

A solution of 147 parts of methyl α-acetoxy-β-ethylidene propionate in 231 parts of benzene is run in at the rate of 330 gm. of solution per hour, per tube, into Pyrex glass tubes of the dimensions given in Example 1, packed with unglazed earthenware rings. The tubes are kept at 500–520° C. The condensed vapors from the tubes are washed free from acid with 15% sodium carbonate solution, and the benzene solution remaining is fractioned in vacuo. A 60% yield of 1-carbomethoxybutadiene-1,3 is obtained.

The corresponding benzoic ester may also be pyrolysed in benzene solution under similar conditions to give a good yield of 1-carbomethoxy-butadiene-1,3.

*Example 5*

β-Ethoxyethyl α-acetoxy-β-ethylidene propionate (made like the esters used in the other examples, but from β-ethoxyethyl alcohol, B. P. 116–119° C./4 mm.) is dissolved in an equal weight of benzene and fed at a rate of 400 gm. of solution per hour through tubes as described in Example 1, kept at 480–500° C. The issuing vapors are condensed, and on working up as described in Example 3, a good yield of the β-ethoxyethyl ester of 1-carboxybutadiene-1,3, B. P. 120–125° C./25 mm. is obtained.

We claim:

1. Process for the manufacture of members of the group consisting of 1-carbalkoxy-butadienes-1,3 and 1-carbalkoxyalkoxy-butadienes-1,3 which comprises heating a member of the group consisting of alkyl-alpha-acyloxy-beta-ethylidene-propionates and alkoxyalkyl-alpha-acyloxy-beta-ethylidene propionates, in which the alkyl and alkoxyalkyl groups have less than six carbon atoms, at thermal decomposition temperature.

2. Process for the manufacture of members of the group consisting of 1-carbalkoxy-butadienes-1,3 and 1-carbalkoxyalkoxy-butadienes-1,3 which comprises heating a member of the group consisting of alkyl-alpha-acyloxy-beta-ethylidene-propionates and alkoxyalkyl-alpha-acyloxy-beta-ethylidene propionates, in which the alkyl and alkoxyalkyl groups have less than six carbon atoms at a temperature between 350° C. and 600° C.

3. Process for the manufacture of members of the group consisting of 1-carbalkoxy-butadienes-1,3 and 1-carbalkoxyalkoxy-butadienes-1,3 which comprises heating a member of the group consisting of alkyl-alpha-acyloxy-beta-ethylidene-propionates and alkoxyalkyl-alpha-acyloxy-beta-ethylidene propionates, in which the alkyl and alkoxyalkyl groups have less than six carbon atoms at a temperature between 450° C. and 550° C.

4. Process for the manufacture of 1-carbalkoxy-butadienes-1,3 which comprises heating an alkyl-alpha-acyloxy-beta-ethylidene-propionate, in which the alkyl group has less than six carbon atoms, at thermal decomposition temperature.

5. Process for the manufacture of 1-carbalkoxy-butadienes-1,3 which comprises heating an alkyl-alpha-acyloxy-beta-ethylidene-propionate, in which the alkyl group has less than six carbon atoms, at a temperature between 350° C. and 600° C.

6. Process for the manufacture of 1-carbalkoxy-butadienes-1,3 which comprises heating an alkyl-alpha-acyloxy-beta-ethylidene-propionate, in which the alkyl group has less than six carbon atoms, at a temperature between 450° C. and 550° C.

7. Process for the manufacture of 1-carbalkoxy-alkoxy-butadienes-1,3 which comprises heating an alkoxyalkyl-alpha-acyloxy-beta-ethylidene-propionate in which the alkoxy-alkyl group has less than six carbon atoms, at thermal decomposition temperature.

8. Process for the manufacture of 1-carbalkoxy-alkoxy-butadienes-1,3 which comprises heating an alkoxyalkyl-alpha-acyloxy-beta-ethylidene-propionate in which the alkoxy-alkyl group has less than six carbon atoms at a temperature between 350° C. and 600° C.

9. Process for the manufacture of 1 carbalkoxy-alkoxy-butadienes-1,3 which comprises heating an alkoxyalkyl-alpha-acyloxy-beta-ethylidene-propionate in which the alkoxy-alkyl group has less than six carbon atoms at a temperature between 450° C. and 550° C.

10. Process for the manufacture of 1-carbomethoxy-butadiene-1,3 which comprises heating methyl-alpha-acetoxy-beta-ethylidene propionate at a temperature between 350° C. and 600° C.

11. Process for the manufacture of 1-carbomethoxy-butadiene-1,3 which comprises heating methyl-alpha-acetoxy-beta-ethylidene propionate at a temperature between 450° and 550° C.

HERBERT GUDGEON.
ROWLAND HILL.

CERTIFICATE OF CORRECTION.

Patent No. 2,232,944.  February 25, 1941.

HERBERT GUDGEON, ET AL.

It is hereby certified that error appears in the printed specification of the above numbered patent requiring correction as follows: Page 2, first column, line 6, for "80-80°" read --80-90°--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.